United States Patent [19]

Murphy et al.

[11] Patent Number: 4,948,021

[45] Date of Patent: Aug. 14, 1990

[54] SPARE-TIRE MOUNT BICYCLE RACK

[76] Inventors: Kevin R. Murphy, 2 Lynnhaven Executive Park; Eddie M. Atkinson, 2585 Elon Dr.; James Phillips, 2610 Potters Rd., all of Virginia Beach, Va. 23452

[21] Appl. No.: 304,640

[22] Filed: Feb. 1, 1989

[51] Int. Cl.⁵ .............................................. B62D 43/00
[52] U.S. Cl. ........................... 224/42.13; 224/42.03 B; 224/42.24
[58] Field of Search ............ 224/42.03 B, 42.13, 224/42.14, 42.16, 42.06, 42.45 R, 319, 42.12, 42.18, 42.19, 42.24, 42.26; 211/17, 18, 22, 5, 7, 8

[56] References Cited

U.S. PATENT DOCUMENTS

| | | | |
|---|---|---|---|
| 1,630,142 | 5/1927 | Spaulding | 224/42.13 |
| 3,482,749 | 12/1969 | Cooper | 224/42.04 |
| 3,972,457 | 8/1976 | Kesler | 224/42.42 R |
| 4,128,195 | 12/1978 | Collins | 224/42.03 B |
| 4,392,597 | 7/1983 | Traugh | 224/42.13 |
| 4,452,385 | 6/1984 | Prosen | 224/42.03 B |
| 4,625,900 | 2/1986 | Lawson | 224/42.45 R |

*Primary Examiner*—Linda J. Sholl
*Attorney, Agent, or Firm*—Griffin, Branigan & Butler

[57] ABSTRACT

A bicycle rack (10) comprises a pedestal mountable on lug bolts (25) of an exterior spare-tire mount including spokes (14a, b and c) which extend axially to the lug bolts. A main support arm (18) extending laterally to the spokes is attachable to outer ends of the spokes by means of an outer hub (16) and has mounted on it a bicycle support arm (20) for supporting a bicycle laterally of the spare-tire mount. First and second angularly-adjustable mounting mechanisms (34 and 42) allow the angular positions of the main support arm relative to the outer hub and the bicycle support arm relative to the main support arm to be adjusted respectively.

10 Claims, 4 Drawing Sheets 4,948,021

SPARE-TIRE MOUNT BICYCLE RACK

BACKGROUND OF THE INVENTION

This invention relates generally to the art of bicycle racks, and, more particularly, to bicycle racks for mounting bicycles on motor vehicles.

As used herein, bicycle racks includes racks for motor propelled bicycles as well as self propelled bicycles.

Many motor-vehicle bicycle racks are difficult to attach to motor vehicles and some of them cause damage to the motor vehicles. With regard to the difficulty of attaching bicycle racks to motor vehicles, not only are motor vehicles constructed in different shapes and sizes, but the styles of new models are constantly changed from those of older models. For this reason, it is difficult for bicycle rack builders to make racks which can be easily mounted on many makes and models of vehicles. Thus, it is an object of this invention to provide a bicycle rack which can be easily mounted on a wide variety of motor vehicles.

Regarding causing damage to motor vehicles, some bicycle racks are made to be mountable on motor vehicle bumpers. Many of these racks require that one have access to top edges of bumpers, however, in many cases, because of the manner in Which modern motor vehicles are made, it is quite difficult to gain access to top bumper edges. Sometimes, in trying to gain such access, damage is caused to the bumpers or to other portions of the motor vehicles. Similarly, even when access can be easily gained to top edges of bumpers, such bumper mounted bicycle racks will sometimes scrape the bumpers. In the same manner, bicycle racks which are mounted on roofs of motor vehicles usually must grip roof gutters of the motor vehicles. However, gutters of various motor vehicles are constructed differently and for this reason hooks and the like of such racks do not always adequately grip them, or sometime damage them. Similar comments can be made with regard to bicycle racks mounted on trunks as well as on other surfaces of motor vehicles. It is, therefore, an object of this invention to provide a motor-vehicle bicycle rack which is easy to securely attach to a motor vehicle and which does not damage the vehicle.

Yet another difficulty with many prior-art motor-vehicle bicycle racks is that they are not completely safe. In this regard, some bicycle racks for motor vehicles are intrinsically unsafe, or they are so difficult to use that a user does not properly mount them on a vehicle and they thereby become unsafe. That is, even after bicycles are mounted on motor vehicles with racks, vibrations eventually cause the bicycles and/or the racks to fall from the motor vehicles. It is therefore, an object of this invention to provide a motor-vehicle bicycle rack which provides a stable mount for a bicycle such that it is virtually impossible for the bicycle and/or the mount to fall from the motor vehicle under normal circumstances.

It has been suggested to mount a bicycle on an exteriorly mounted spare tire, however, such suggested bicycle racks have not provided sufficient security for the bicycles. Therefore, it is an object of this invention to provide a bicycle rack which does provide positive mounting security.

SUMMARY

According to principles of this invention, a bicycle rack includes an inner hub which is mountable on lug bolts of an exterior spare-tire mount, spokes for extending axially to the lug nuts, an outer hub attaching a main support arm to outer ends of the spokes, and a bicycle support arm attached to the main support arm for mounting a bicycle lateral to the spare-tire mount. First and second angularly-adjustable mounting mechanisms allow the angular positions of the main support arm to the spokes and the bicycle support arm to the main support arm to be adjusted.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENTS

Figure 1:
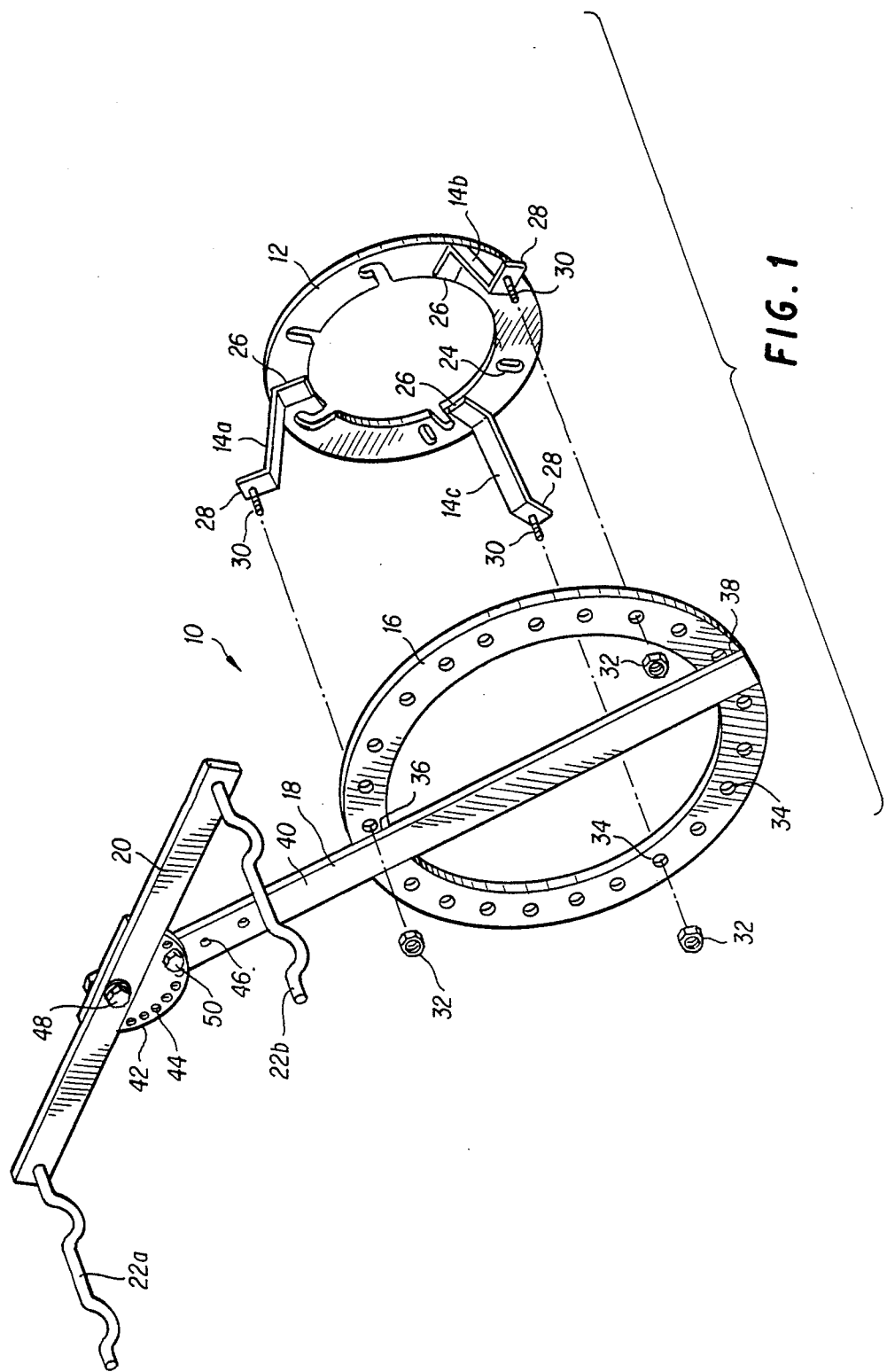
FIG. 1 is a partially exploded, isometric, view of a spare-tire mount bicycle rack of this invention.
Figure 2:
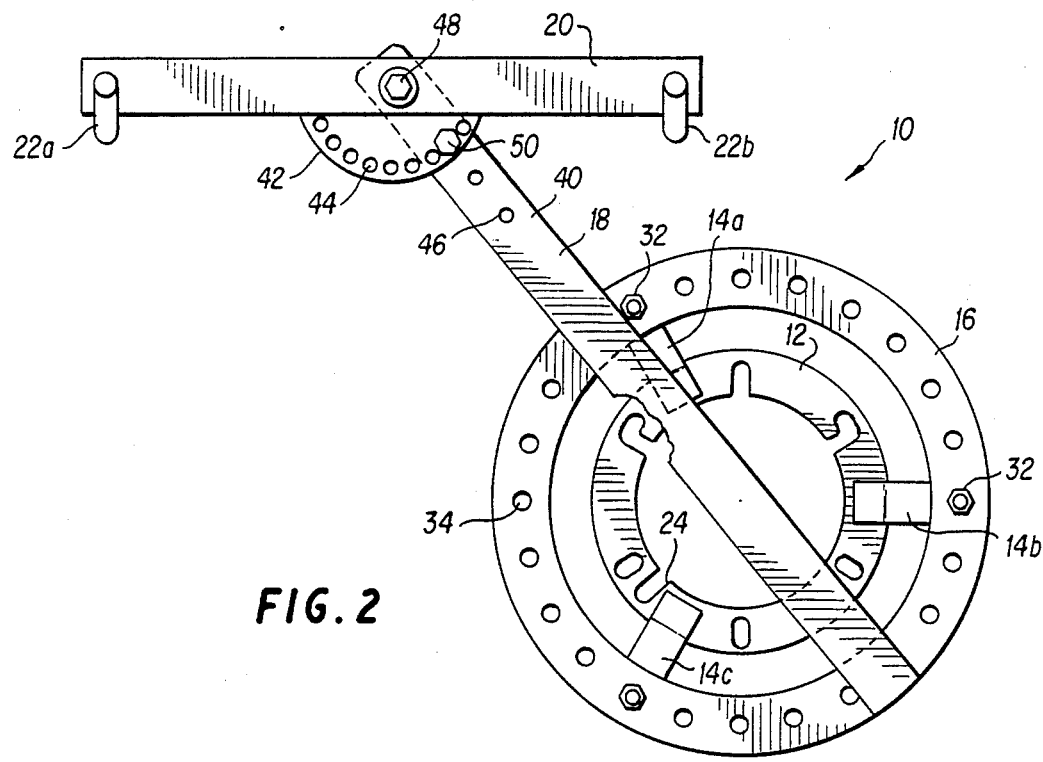
FIG. 2 is a rear view of the bike rack of FIG. 1 when it is assembled.

A spare-tire mount bicycle rack 10 comprises an inner hub 12, spokes 14a, 14b and 14c, an outer hub 16, a main support arm 18, a bicycle support arm 20, and bicycle hangers 22a and 22b.

In the illustrated embodiment, the inner hub 12 is in the shape of a ring with a 4 inch inside diameter and a 6½ inch outside diameter having a number of holes, slots, and the like 24 therein for receiving lug bolts 25 of an exterior spare-tire mount for a motor vehicle 60. In this respect, there are various lug-bolt arrangements for tires, some of them including six equal-angularly spaced bolts 25 and some including five. Similarly, various arrangements of lug bolts have diameters ranging from 4½ inches to 6 inches. In any event, the holes and slots 24 of applicant's inner hub 12 are arranged to fit all arrangements of lug bolts for spare tires.

The spokes 14a, 14b and 14c, in the illustrated embodiment, are welded at inner ends 25 thereof to the inner hub 12 at angularly spaced positions on the inner hub 12. In this regard, it is not essential that the spokes 14a, b and c be equally spaced and, in fact, it is not convenient to have them exactly equally spaced because of the various holes and slots 24 required to achieve a universal inner hub 12. In any event, the spokes extend radially outwardly to provide support for the outer hub 16 and the items mounted thereon. In this respect, in the FIGS. 1-4 embodiment the outer hub 16 is mounted at outer ends 28 of the spokes 14a, b and c by means of bolts 30 and nuts 32. That is, the bolts 30 extend through holes in the outer ends 28 of the spokes 14a, b and c and also through holes 34 in the outer hub 16. The outer hub 16 is also ring shaped and has holes 34 thereabout for receiving the bolts 30. By choosing the appropriate holes 34 through which the bolts 30 are extended, the angular position of the main support arm 18 can be controlled.

The main support arm 18, in the illustrated embodiment, is welded to the outer hub 16 at 36 and 38 so that a laterally displaced portion 40 is positioned laterally to a pedestal formed by the inner hub 12 the spokes 14a, b and c and the outer hub 16.

The bicycle support arm 20 includes an adjustable mounting mechanism 42 having a semicircular shape with holes 44 arranged in a semicircle thereabout. The laterally displaced portion 40 of the main support arm 18 has linearly-positioned holes 46 arranged there along to allow the position of the bicycle support arm 20 to be adjusted there along. A bolt 48 passing through a center hole of the bicycle support arm 20 also passes through one of the holes 46 in the main support arm 18 and, in conjunction with a nut, attaches these two members together. Similarly, a bolt 50 passing through one of the holes 44 of the adjustable mounting mechanism 42 and through one of the holes 46 of the main support arm 18 retains the bicycle support arm 20 in a selected angular position relative to the main support arm 18. The bicycle hangers 22a and 22b are fixedly attached at appropriate positions along the bicycle support arm 20.

Figure 3:
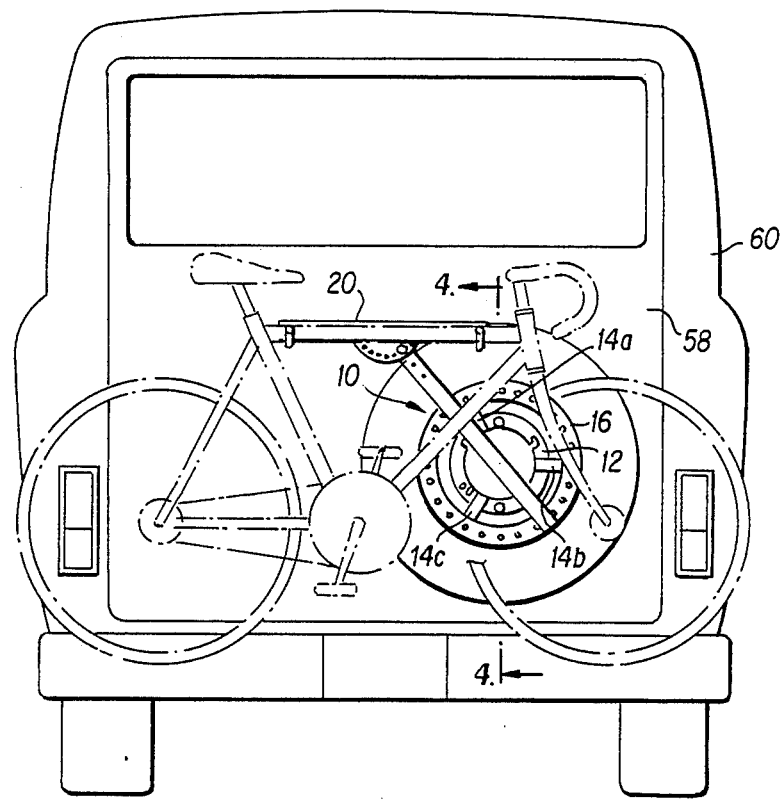
FIG. 3 is a rear view of the bike rack of FIGS. 1 and 2 mounted on a motor vehicle with a bicycle mounted on the bike rack.
Figure 4:
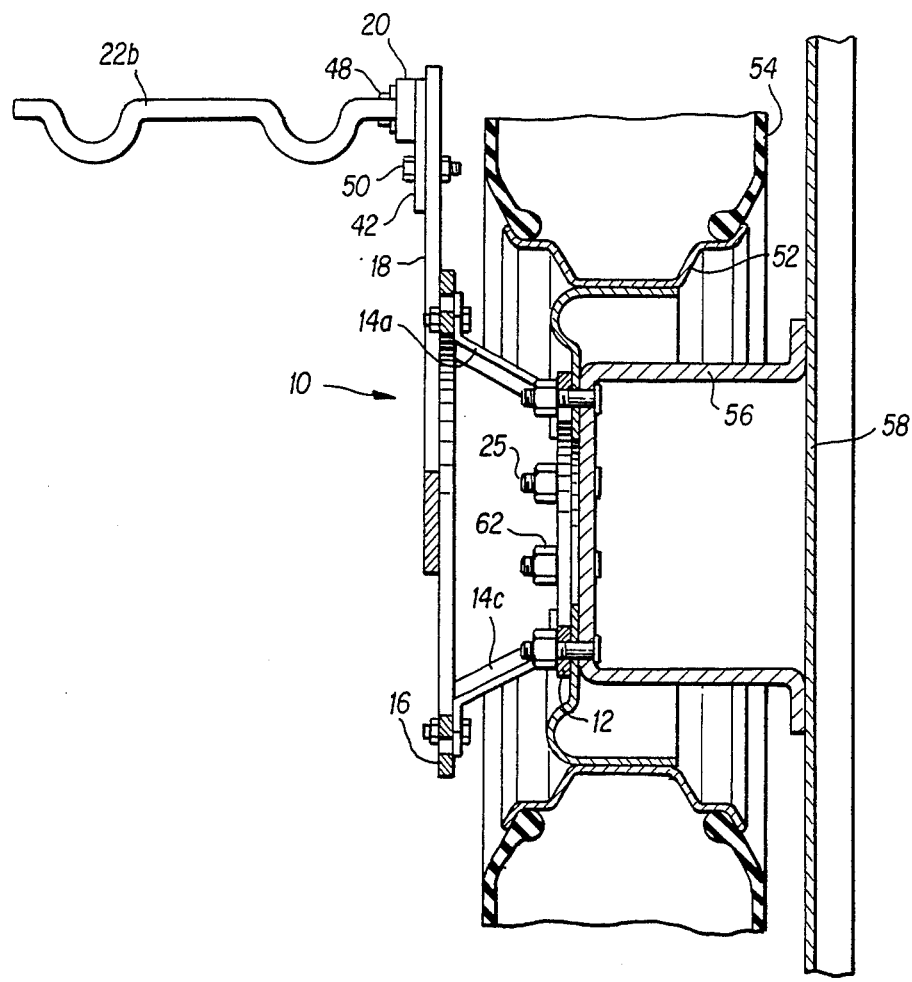
FIG. 4 is a side sectional view taken on line 3—3 of the bike rack of FIG. 3 without the bicycle and with only a small portion of the motor vehicle shown therein.

Describing now use of the spare-tire mount bicycle rack 10, with reference to FIGS. 3 and 4, a spare wheel 52 of a spare tire 54 is mounted on the lug bolts 25 of a spare-tire bracket 56 which, in turn, is mounted on a rear panel 58 of a motor vehicle 60. The inner hub 12 is also mounted on the very same lug bolts 26, outside of the wheel 52, before lug nuts 62 are screwed onto the lug bolts 26 to hold both the inner hub 12 and the spare tire wheel 52 on the sparetire bracket 56. By choosing an appropriate angular position of the inner hub 12 before the lug nuts 62 are fastened onto the lug bolts 26, it might be possible to position the main support arm 18 in a desire angular position without requiring movement of the outer hub 16 on the spokes 14a, b and c. However, if it is necessary to change the angular position of the main support arm 18 relative to the inner hub 12, this is easily possible by loosening the nuts 32 on the bolts 30, moving the outer hub 16 to a new angular position, and retightening the nuts. Similarly, it is possible to adjust the angular position of the bicycle support arm 20 relative to the main support arm 18 by tightening and loosening the bolts 48 and 50. Once the bicycle rack is in place, bicycles can be mounted on the bicycle hangers 22a and b.

Figure 5:
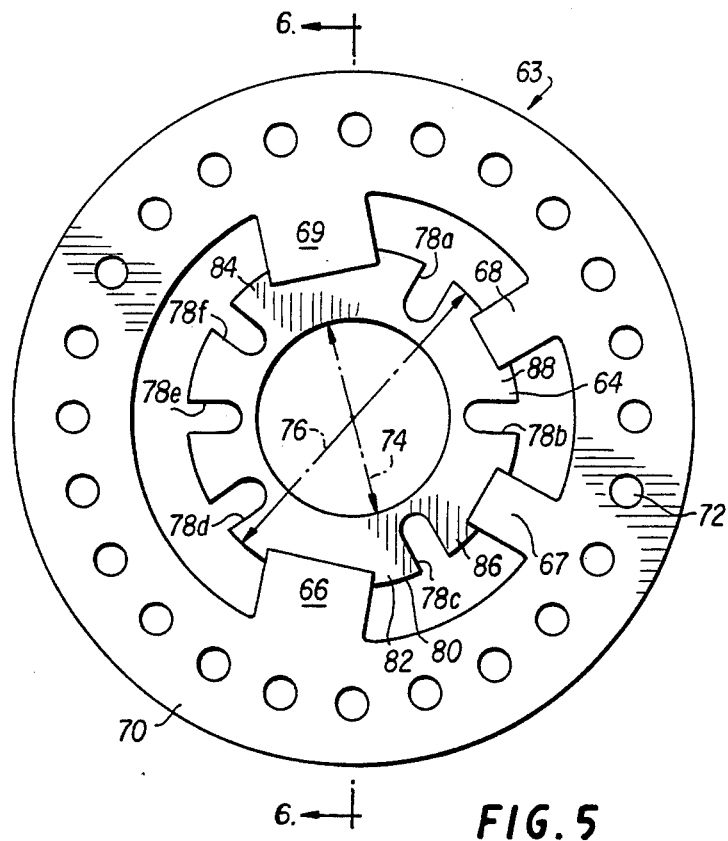
FIG. 5 is a rear view of a pedestal portion of an alternate embodiment bike rack according to principles of this invention.
Figure 6:
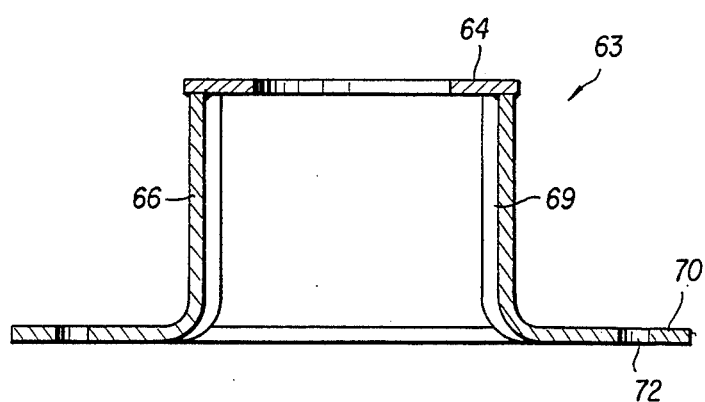
FIG. 6 is a cross-sectional view taken on line 6—6 in FIG. 5.

FIGS. 5 and 6 depict an aspect of another embodiment of the invention in which a pedestal 63 comprises an inner hub 64, spokes 66, 67, 68 and 69 and an outer hub 70 permanently joined as one piece. In this regard the pedestal 63 can be cast as one piece of aluminum or the spokes 66, 67, 68 and 69 can be cast as one piece with the outer hub 70 and then bent and welded to the inner hub 64. In this embodiment the outer hub 70 is not permanently welded to the main support arm 18 as in the FIGS. 1-4 embodiment but rather a modified main support arm (not shown) has holes therein corresponding to holes 72 in the outer hub 70 and is attached thereto by bolts (not shown) passing through these holes 72. The angular position of such a modified main support arm (not shown) can be adjusted by moving these bolts (not shown) to different holes 72 in the outer hub 70.

Another feature of the FIGS. 5 and 6 embodiment is found on the inner hub 64 and the spokes 66, 67, 68 and 69. In this respect, the inner hub 64 has an inner diameter 74 of 3.5 inches and an outer diameter 76 of 6 inches. Radial lug slots 78a, b, c, d, e, and f extend inwardly from an outer perimeter edge 80 of the inner hub 64 for a distance of approximately 1.875 inches. The lug slots are 0.28 inches wide. Lug slots 78a, b, and c form a first cluster of lug slots in which lug slots are separated from one another by 60°. Lug slots 78d, e, and f form a second cluster of lug slots, positioned 180° from the first cluster, in which adjacent slots are separated from one another by 36°. It has been found that such an arrangement of lug slots will fit almost all five (5) and six (6) lug bolt arrangements of motor vehicles.

The spokes 66 and 69 are each two inches wide and are attached to the inner hub 64 in the areas 82 and 84, between the first and second lug slot clusters, and the spokes 67 and 68 are one inch wide and are attached to the inner hub 64 in the areas 86 and 88 between the lug slots in the first cluster (which are separated from one another by 60°). This arrangement provides strong support for bikes mounted on the bike rack while allowing the bike rack to have universal application.

It will be appreciated by those of ordinary skill in the art that the bicycle rack of this invention positively and securely fastens to motor vehicles by means of structures on the bodies of the motor vehicles which are intended for rugged use, namely, the spare-tire mounting brackets and bolts. Thus, this bicycle rack does not damage motor vehicle bodies. Further, it will be appreciated by those of ordinary skill in the art, that this bicycle rack is totally safe and is much less likely to fall from a motor vehicle than are most prior-art bicycle racks. Further, it is possible to remove the main support arm 18 from the spokes and leave a portion of the bicycle rack mounted on the spare tire bracket 56 and in such position, it is possible to still put most spare tire covers over the spare tire 54 so that that portion of the bicycle rack left on the spare-tire bracket 56 no longer shows.

The bicycle rack of this invention is extremely easy to mount, one need only use a wrench for the lug nuts 62. In one embodiment, all other nuts and bolts involved are also the same size as lug nuts so that only one wrench is required for mounting the spare-tire mount bicycle rack of this invention. The positions of the spokes and the inner and outer hubs allow one to easily get at the lug nuts 62 for tightening them and loosening them. The angular adjustments, and linear adjustments allowed by the rack allow the rack to be adjusted to fit almost all vehicles having exterior spare tire mounts.

While the invention has been particularly shown and described with reference to a preferred embodiment, it will be understood by those skilled in the art that various changes in form and detail may be made therein without departing from the spirit and scope of the invention. For example, in one embodiment, the inner hub is not comprised of a ring, but rather is made up of the individual ends of the spokes 14a, b and c, which have holes therein for receiving the lug bolts 26. In other words, the inner ends of the spokes 14a, b and c are not interconnected by the hub, but rather, the hub is made up of three separate mounts for the spokes. In the FIGS. 5 and 6 embodiment, as described, the outer hub is welded to outer ends of the spokes rather than being bolted thereto and the main support arm is not welded to the outer hub, but rather can be moved thereabout by bolts which pass through holes in the outer hub. It is also possible to make the spokes shorter than is depicted so that they fall inside the sidewalls of the tire 54. Thus, when the main support arm is taken off of the outer hub, a cover placed on the spare tire 54 is not caused to stick out by what is left of the spare-tire mount bicycle rack. In this embodiment, it is possible to use spacers between the outer hub and the main support arm so that the main support arm will clear the spare tire 54.

It should be appreciated that the bicycle support arm 20 can be moved along the main support arm 18 by changing the position of the bolt 48 in holes 46 of the main support arm 18 to achieve a proper position of bicycles on a body of the motor vehicle 60.

The embodiments of the invention in which an exclusive property or privilege are claimed are defined as follows:

1. A vehicle mountable bicycle rack for mounting a bicycle on spare-tire-mounting lug bolts attached to the exterior of a motor vehicle body said bicycle rack comprising:
    an inner mounting hub for defining a plurality of circularly-arranged holes spaced to fit lug bolts of wheels on the motor vehicle:
    a pedestal for attaching a main support arm to said inner mounting hub said pedestal comprising at least one spoke affixed at an inner end thereof to said inner hub for extending axially relative to said circularly-arranged holes;
    the main support arm having an inner end portion attached to an outer end of said at least one spoke to extend radially relative to said circularly-arranged holes; and
    a bicycle support arm attached to an outer end portion of said main support arm for supporting a bicycle;
    said pedestal including an attachment means attached to said at least one spoke allowing said main support arm to be separated from said inner mounting hub and to be reattached thereto at a different angle relative thereto without changing the position of said inner mounting hub to said lug bolts;
    whereby, when said bicycle rack is mounted on a motor vehicle a bicycle can be mounted on the support arm at a selected angle relative to the inner mounting hub and the motor vehicle body from lug bolts mounted on the exterior of the vehicle body while a spare tire is also mounted on the lug bolts and the main support arm can be removed and reattached to the inner hub so as to change the angle of main support arm relative to the motor vehicle body, approximately about an axis defined by said circularly arranged holes arranged to fit lug bolts, without changing the position of the inner hub on the motor vehicle.

2. A vehicle mountable bicycle rack as in claim 1, wherein there are a plurality of spokes angularly spaced from one another on said inner hub for interconnecting said inner hub with an outer hub, and wherein said pedestal further includes said outer hub attached at said outer end of said spokes to which said inner end portion of said main support arm is attached.

3. A vehicle mountable bicycle rack as in claim 2, wherein said inner hub is ring shaped with radially elongated lug slots thereabout for receiving said lug bolts.

4. A vehicle mountable bicycle rack as in claim 3, wherein said outer hub is ring shaped and said attachment means includes a plurality of outer hub holes angularly spaced in said outer hub and lugs on said spokes for insertion into said outer hub holes.

5. A vehicle mountable bicycle rack as in claim 4, wherein is included an angularly-adjustable mounting means for mounting said bicycle support arm to said main support arm so as to allow angular adjustment between these two members in a plane approximately parallel to planes of angular adjustment provided by said adjustment means for said main support arm.

6. A vehicle mountable bicycle rack as in claim 1 wherein there are six elongated lug slots on said inner hub, said slots being arranged in two clusters of three lug slots each positioned 180° from one another, with the lug slots in a first cluster being separated by approximately 60° and the lug slots in a second cluster being separated by approximately 36°.

7. A vehicle mountable bicycle rack as in claim 6 wherein said inner hub has an inner diameter of approximately 3.5 inches, an outer diameter of approximately 6 inches and the lug slots extend radially inwardly from an outer perimeter thereof for a distance of approximately 1.875 inches.

8. A vehicle mountable bicycle rack as in claim 6 wherein there are four spokes, with first and second spokes respectively being attached to said inner hub at areas respectively between said lug-slot clusters and said third and forth spokes being attached to said inner hub at areas respectively between said lug slots in said first cluster.

9. A vehicle mountable bicycle rack as in claim 2, wherein said outer hub is ring shaped and said attachment means includes a plurality of outer-hub holes angularly spaced in said outer hub and lugs on said spokes for insertion into said outer hub holes.

10. A vehicle mountable bicycle rack as in claim 9, wherein is included an angularly-adjustable mounting means for mounting said bicycle support arm to said main support arm so as to allow angular adjustment between these two members in a plane approximately parallel to planes of angular adjustment provided by said adjustment means for said main support arm.

* * * * *